United States Patent [19]

Horwitt et al.

[11] 4,130,815
[45] Dec. 19, 1978

[54] FORMED HEATING RIBBON AND COIL

[75] Inventors: Laurence G. Horwitt, New Haven; Donald J. Mattis, Norwalk; Harry Greenberger, Bridgeport, all of Conn.

[73] Assignee: Sun Chemical Corporation, New York, N.Y.

[21] Appl. No.: 832,834

[22] Filed: Sep. 13, 1977

[51] Int. Cl.² .............................................. H01C 3/00
[52] U.S. Cl. ................................... 338/282; 219/265; 219/267; 338/279
[58] Field of Search ............... 219/265, 267, 270, 552, 219/553; 338/282, 278, 279, 296

[56] References Cited

U.S. PATENT DOCUMENTS

| | | | |
|---|---|---|---|
| 2,959,663 | 11/1960 | Fenn | 219/270 |
| 2,959,664 | 11/1960 | Fenn | 219/270 |
| 2,975,262 | 3/1961 | Schnick | 219/270 |
| 3,909,587 | 9/1975 | Mattis | 219/270 |

Primary Examiner—C. L. Albritton
Attorney, Agent, or Firm—Cynthia Berlow

[57] ABSTRACT

An electric igniting element as used in automobile cigar lighters, jet engine igniters and like devices, comprising a spirally wound tight coil made of metal heater ribbon which is transversely formed to have a cross-sectional configuration roughly similar to a wide-spread letter "V" but with a flattened bottom portion and two beaded edge surfaces along one side, which greatly facilitate the coil winding process, effect a greater uniformity, extend the range of coil stock that can be handled while at the same time resulting in a nesting and interlocking of the convolutions that not only provide a mutual support of the same but also produce a small coil having a high metal density.

4 Claims, 6 Drawing Figures

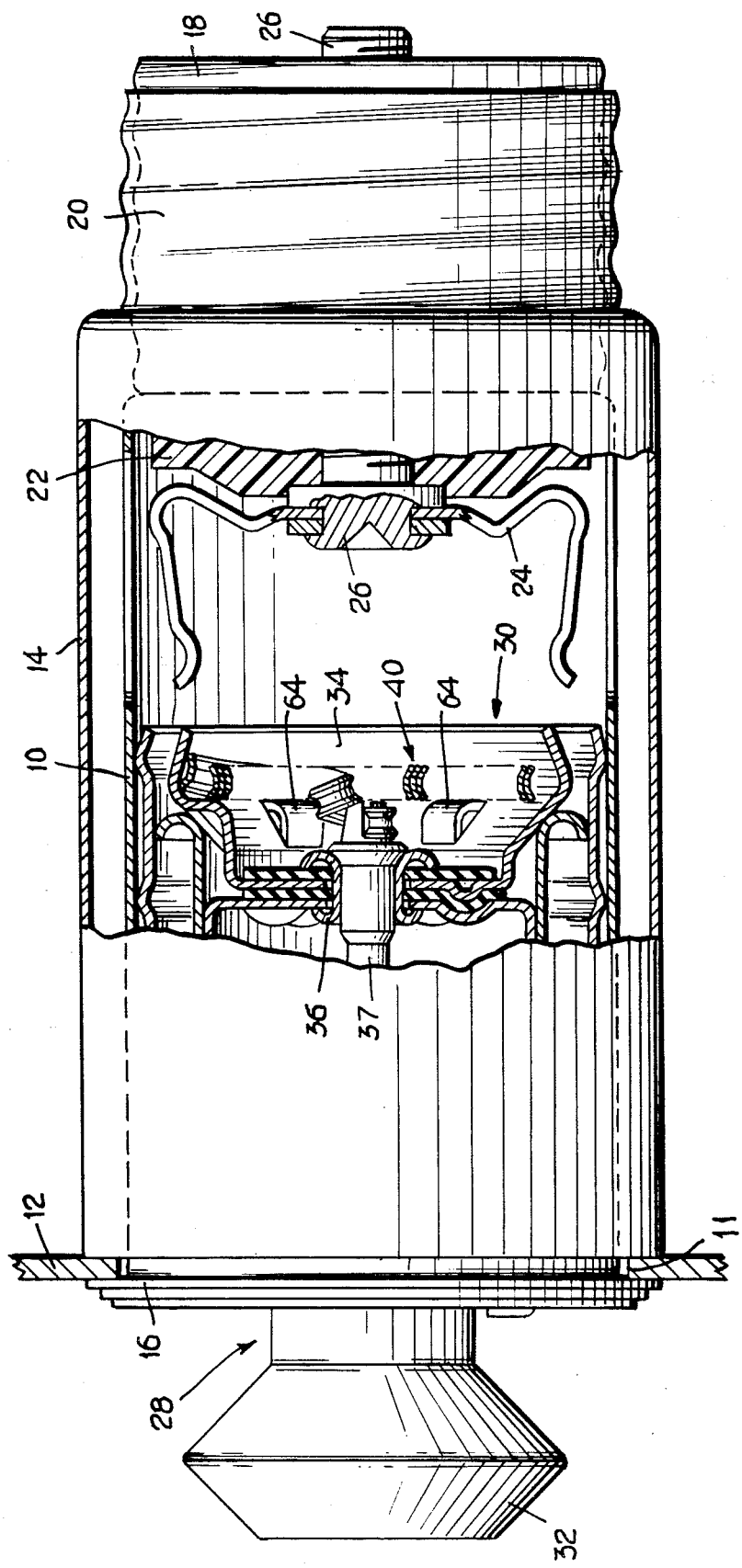

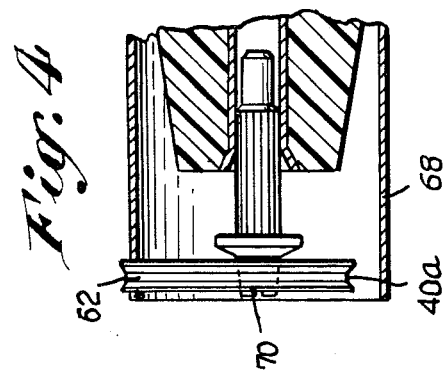
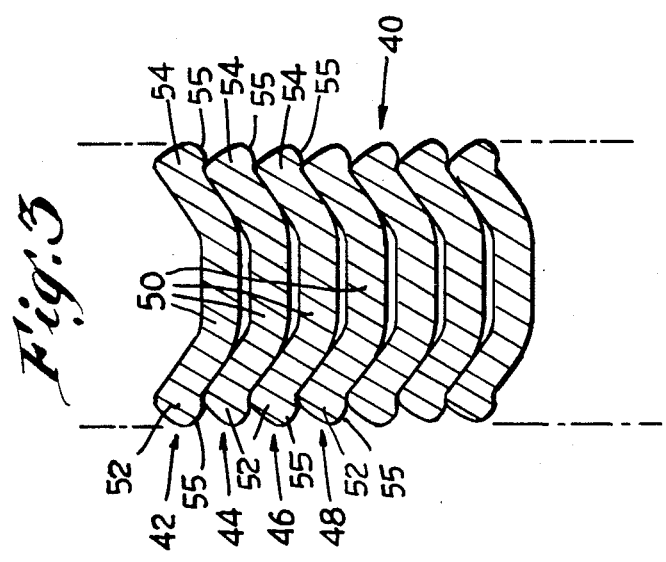
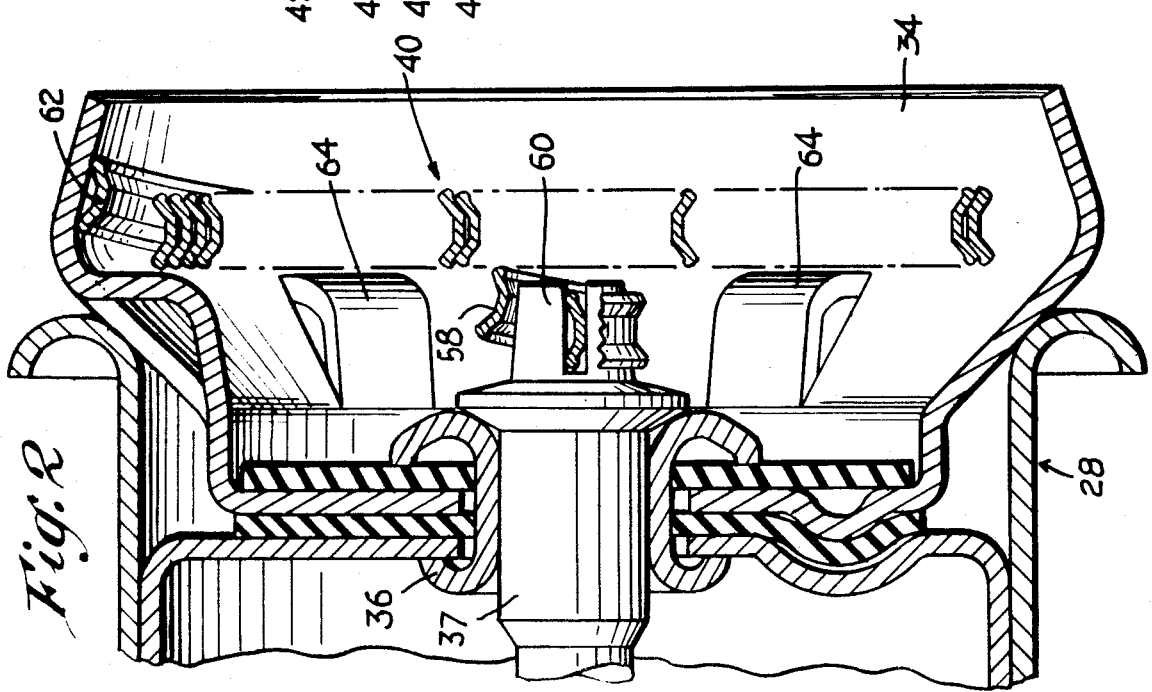

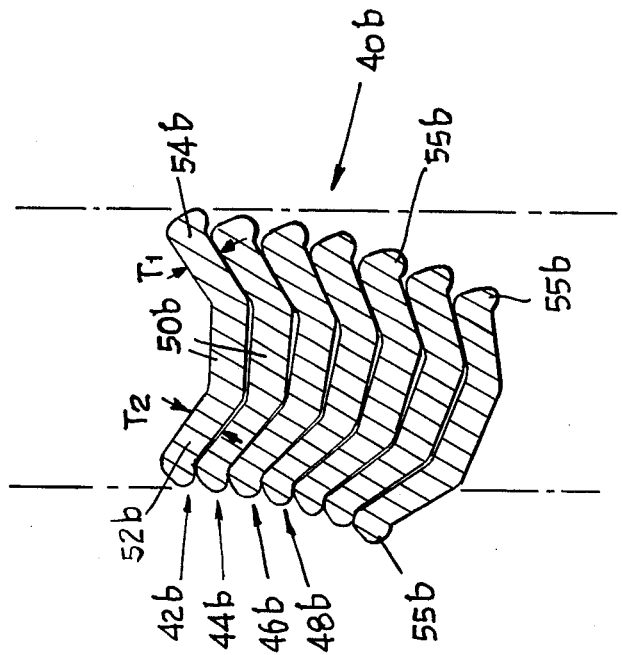
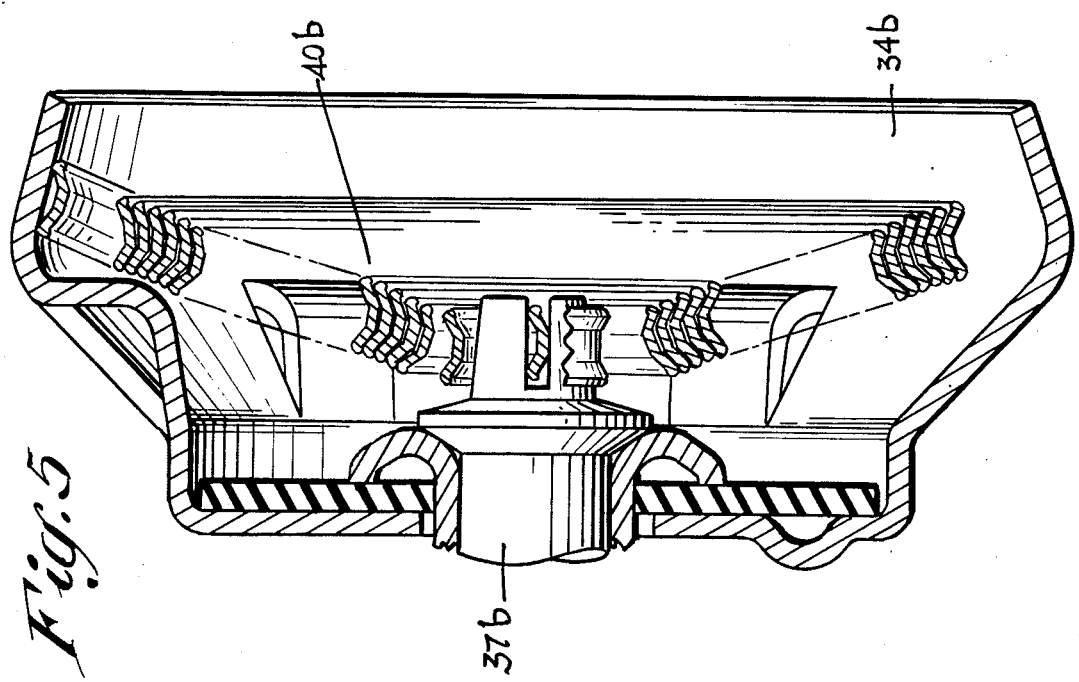

FORMED HEATING RIBBON AND COIL

BACKGROUND

Electric cigar lighters for automobiles, boats, jet engine igniters and like devices commonly utilize spiral-wound heating coils. The cigar lighters to which this invention is applied herein are well known, particularly in the automotive industry where most cars are equipped with one or several such devices. For many years during the development of the automobile, electric cigar lighters consisted essentially of a cylindrical receptacle and a spring-biased removable plug which was normally carried in the receptacle, the plug having a spiral, 6-volt igniting coil at its inner end. The igniting coil was mounted in a metal cup, and was heated by shifting the plug deeper in the receptacle so as to cause engagement of the metal cup with a metal or bimetallic contact clip that completed an electrical circuit through the coil. In automatic lighters, by the time the coil heated to its normal, tobacco-igniting temperature, the concurrently heated bimetallic clip had spread apart, rleasing the cup whereupon the plug snapped forward and broke the circuit. The plug was then ready for removal from the socket for use.

After years of manufacturing cars equipped with 6 or 7 volt electrical systems, the car manufacturers saw the advantages of, and adopted a 14 volt system, utilizing a 12 volt battery instead of the prevailing 6 volt size. This, however, necessitated a redesign of the cigar lighter coils, since it now became necessary to utilize a thinner wire or ribbon having a greater length, in producing the igniting coil. At the same time, the coil-carrying cups in the lighters retained their original diameters. The new coils accordingly were much less rugged, since the thinner, longer 12 volt or 14 volt ribbon lacked the support and physical strength characteristics of its 6 volt predecessor.

The change in ribbon size was especially important, since the heating coil constituted a particularly critical part of all car lighters. In use, the coil is repeatedly heated to a high degree of incandescence and then applied to the tips of the cigars and cigarettes to light the tobacco. This coil is ordinarily secured only at its respective ends, and the many spiral convolutions are otherwise unsupported except for a backing member of mica, ceramic or other material. The ribbon is made of thin gauge stock due to the need for compactness, since it is required to fit within the original 6 volt size cup or in shells of even smaller diameter. And, it is subjected to various kinds of stress, shock and abuse including elevated temperatures, vehicle vibration, pressure against cigar and cigarette tips, and tapping or scraping to remove burned tobacco particles.

Efforts have been directed toward redesigning the higher voltage heating coils so they can resist such stresses and abuse, thereby to assure more reliable performance as well as retention of the original shape and alignment despite considerable use.

It is already known that the ribbon making up the igniting coil can be advantageously grooved, formed or bent laterally to give a cross-sectional configuration or contour which provides a nesting or interlocking relationship between successive convolutions. For example, U.S. Pat. Nos. 2,959,663 and 2,959,664 granted on Nov. 8, 1960 to L. E. Fenn and U.S. Pat. No. 3,909,587 granted on Sept. 30, 1975 to Donald J. Mattis show various cross-sectional configurations of a ribbon-like coil strip intended for automatic electric cigar lighters. While these solved a number of the existing problems, they represented costly or slow procedures or else were subject to failures due to cracking or overstretching of the metal at the bends. Limitations existed as to the ribbon thicknesses which could be used, and problems were had in obtaining the necessary very high quality. Moreover, the Fenn proposals did not provide for sufficiently high overall density of heater metal in the coil while at the same time retaining low cost, since the proposals which achieved high density required special costly ribbon sections of unusual, non-uniform thickness.

The requirements of ruggedness or strength, compactness and small size of heating coils also exist in the field of jet engine igniters and kindred devices. Here, large units are especially undesirable, and existing voltage and current supplies are not easily changed. For such use, high metal density in the coil and reliability of performance coupled with low cost represent important considerations, in addition to small coil size.

SUMMARY

The present invention obviates the disadvantages and drawbacks of prior, tight-wound spiral igniting coils, and one object of the invention is to provide an improved spiral igniting coil structure in which a ribbon-like metallic strip has a unique transverse configuration which not only simplifies and greatly facilitates the coiling operation, but also provides a finished product of improved uniformity.

A related object of the invention is to provide an improved spiral-wound igniting coil having the above advantages, and wherein there is made possible an improved interlocking or nesting of the convolutions which results in a high density of heater metal in a coil of very small size, all while maintaining fabricating costs at a low figure. By virtue of the provision of unique bead formations along its side edges and thinner flange portions, the ribbon of this invention can be more easily wound in a tight coil which provides important advantages in design and performance that were not possible with previously-known spiral wound igniting coils.

Another object of the invention is to provide an improved spiral wound igniting coil as above set forth, wherein only a slight transverse bending of the ribbon or strip is required to accomplish the desired result, thereby minimizing the likelihood of cracking or failure of the metal when the coil is in use.

A further object of the invention is to provide an improved spiral-wound igniting coil in accordance with the foregoing, which is adaptable for use with a wide range of thicknesses of ribbon whereby its field of usefullness is greater than that of prior coil constructions.

A feature of the invention resides in the provision of an improved igniting coil construction as above, which can be readily produced either in flat pancake shape or else in the form of a well-shaped cone.

In accomplishing the above objects, the invention provides ribbon-like wire or strip stock having a cross-sectional shape in the nature of a wide spread letter "V" with a flattened bottom portion, and with beaded edge surfaces along its bulbous or convex side. Also, the flanges or "legs" of the cross-sectional shape are thinner than the central portion. The beaded edges are thus thicker than the remainder of the angular portions or flanges, as is also the flattened bottom or central portion.

We have found that a formed ribbon-like metallic strip with a cross section as above characterized can be especially easily spirally-wound, utilizing uniform winding pressures, to form a high quality coil. The free end of the inner convolution can be secured to a center contact stud in the usual manner, and the free end of the outer convolution similarly secured to the container cup. The flattened "V," nesting cross-sectional configuration of the strip, in conjunction with the securing of the respective ends, enables the coil to resist axial displacement to a considerable degree when subjected to external forces.

The relatively flat angles between the flat central ribbon portion and the respective angular or flange-like edge portions minimize transverse stretching of the metal grain structure, as compared with many prior coil ribbons as used in present commercial heating elements. Such reduced stretching in conjunction with the specific configuration described, permits the use of a wider range of ribbon sizes, as to width and thickness. We have found that with the foregoing construction there is thus made possible an easier coiling of the wire, as well as a greater uniformity of product, enabling high quality small coil sizes to be produced, which are characterized by an appreciably longer service life.

Other features and advantages will hereinafter appear. In the accompanying drawings:

FIG. 1 is a view partly in side elevation and partly in axial section, of an automatic electric cigar lighter embodying the improved heating coil of the invention.

FIG. 2 is a fragmentary axial sectional view, enlarged, of the heating element assemblage of the lighter of FIG. 1.

FIG. 3 is a fragmentary sectional view, greatly enlarged, through several coil convolutions illustrating the stretched-out or flattened "V" configuration given to the cross section of the ribbon.

FIG. 4 is a fragmentary axial sectional view of a spiral wound heating coil assemblage such as is employed in igniter plugs.

FIG. 5 is a fragmentary axial sectional view like that of FIG. 2, showing in greatly enlarged manner a heating element assemblage constituting another embodiment of the invention, and FIG. 6 is a fragmentary axial sectional view, also greatly enlarged, through several convolutions of the heating coil of FIG. 5.

As illustrated in FIG. 1, the invention is embodied in an automatic electric cigar lighter comprising a tubular receptacle 10 which is mounted through an opening 11 in a panel or dashboard 12 by means of a clamping sleeve 14 that engages the rear of the panel. A front flange 16 of the receptacle 10 engages the front face of the panel 12, and the receptacle has a threaded shell 18 at its rear on which there is screwed a reduced, threaded portion 20 of the clamping sleeve 14.

An insulating block 22 within the receptacle 10 is carried at the inside of the rear receptacle wall and mounts a bimetallic contact clip 24. The clip 24 is attached to a terminal stud 26 which projects from the rear of the receptacle and is adapted for connection to the "hot" lead of an energizing circuit, such as the positive terminal of the car battery.

The cigar lighter includes a removable igniting unit or plug 28 comprising a body assemblage which is generally designated by the numeral 30 and which is slidably receivable in the receptacle 10 and removable therefrom in the well-known manner. At its front the plug body assemblage 30 has a knob 32 by which it can be grasped and handled. The inner end of the assemblage 30 has a metal heating element cup 34 which is secured to the end wall of the assemblage by means of small eyelet 36, the latter being insulated from the cup and electrically connected to the assemblage in the usual manner.

Further details of the receptacle 10 and igniting unit 28 are not given here, since per se they form no part of the present invention. Such details are illustrated and described fully in U.S. Pat. No. 3,870,857 issued Mar. 11, 1975 to Laurence G. Horwitt and Donald J. Mattis and entitled "Cigar Lighter Igniting Unit;" the construction of the cigar lighter of such patent is accordingly made a part of the present disclosure.

As is usual with automatic electric cigar lighters, energization of the heating element carried in the cup 34 is effected by pressing inward (or to the right as viewed in FIG. 1) the knob 32, which shifts the cup and related parts more deeply into the receptacle 10, thereby to establish electric contact between the cup 34 and the bimetallic clip 24. The cup 34, upon engagement with the bimetallic clip 24, will spread apart the arms thereof and will be yieldably retained in its deep, circuit-closing position. The circuit from the terminal stud 26 and clip 24 is thus established to the cup 34, from whence current can flow through the heating element or coil (contained in the cup and shortly to be described) and through a central terminal stud 37 to the ground side of the circuit as represented by the well 10 and dashboard 12.

In accordance with the present invention, there is provided for disposition within the contact cup 34 a novel, a tightly wound spiral heating coil 40 which is formed of metal ribbon having a unique cross-sectional configuration by which the coil can be especially easily and accurately wound without deforming said configuration, and by which a wide range of ribbon thickness can be handled, while at the same time the coil can have a small diameter and high density of heater metal. The cross-sectional configuration is such that uniform and non-critical winding pressures can be utilized while still obtaining a coil which is readily, tightly wound, being characterized by the longitudinal marginal portions of the ribbon when formed into convolutions being closely juxtaposed and essentially contiguous. When viewed in cross-section, the longitudinal central ribbon portions lie in a helix about the axis of the coil, whereas, side edge portions of the ribbon have an angular disposition with respect to the longitudinal central portion and with the axis of the coil, enabling the coil convolutions to nest with each other so that they effect a mutual support. The cross-sectional configuration resembles a flattened or spread-apart letter "V" but with a blunted or flattened bottom portion. The improved heating element coil of the invention has been found to have a high degree of strength or ruggedness as well as a high density of heater metal while at the same time being capable of a desirable small size or diameter.

Referring to FIGS. 2 and 3, the coil is illustrated as comprising multiple convolutions, four of which are numbered consecutively 42, 44, 46 and 48, the cross-sectional shape of said convolutions, as mentioned above, being somewhat similar to that of a stretched-out or flattened letter "V" with the bottom flattened. Each coil convolution can be considered as having a central longitudinal portion 50 lying in a helix, and integral opposite side edge or flange portions 52, 54. When the convolutions are viewed in cross section, the edge portions 52, 54 are seen to be symmetrically angularly disposed with respect to the longitudinal, helical central portion 50, the configuration being much like that which would be obtained if a short piece of flat strip stock were to be bent in commencing to form it into a shallow trough. Additionally, the longitudinal edges of the angular flange portions 52, 54 have beads 55 which are disposed on the convex side of the ribbon, resulting in thickened edges as clearly seen in FIG. 3, for example. These beads are important in that they insure the proper relative placement of the convolutions during the coiling process, without relying on variations in the force applied to the pressure roll. In other words, they function to effect a precise nesting of the convolutions as the coiling of the element is carried out. When the coil 40 is tightly wound, as in a suitable fixture which confines the edge portions 52, 54, these will be in intimate contact with each other as illustrated in FIG. 3, and the helical central portions 50 will be spaced apart or from each other a slight amount. Such spacing can be very little, as on the order of several thousandths of an inch for example. An important advantage of the invention is that the winding of the coil, utilizing a pressure roll, can be carried out without critical force being required on the roll. A wide range of force can be applied to the pressure roll without adversely affecting the control parameters, and the cross-sectional configuration of the formed and annealed ribbon is not altered or deformed. In consequence, a desirable high uniformity is had in the finished product. Additionally, a wide range of ribbon thickness can be processed, from very thin gauges to very thick gauges, making for great flexibility in coil ratings, as to sizes, voltages, wattages etc.

The forming of the ribbon stock to provide the indicated cross-sectional configuration shown in FIG. 3 can be the result of a forceful rolling and swaging operation by which suitable rollers engage opposite sides of the ribbon and bend and flow the edge portions into the angles and shapes illustrated.

As seen in FIG. 2, the inner convolution or end portion 58 of the coil 40 is attached to the central terminal stud 37, the latter having a slotted head 60 for this purpose and the attachment being effected by a suitable bonding procedure, as is well known. The outer convolution 62 of the coil 40 can be bonded to the inner wall of the cup 34, also in the usual manner.

The cup 34 is shown as being provided with a plurality of inwardly lanced supporting portions or shoulders 64 which are arranged to engage at least the outermost convolution of the coil 40 and provide a backing therefor.

By virtue of the stretched-out "V" shape which the convolutions have in cross section, together with the angularity and beading of the portions as indicated above, the convolutions can nest with each other and provide mutual support, especially if the convolutions are tightly coiled to bring the angular areas 52, 54 in contact, whereby the coil is surprisingly rugged and able to withstand axial force, shock, vibration, etc. Not only are the inner and outer ends of the coil securely fastened to anchorage points, but also the outermost convolutions of the coil are backed and supported by the shoulders 64 in the cup. All these points of support, in conjunction with the nesting of the convolutions, result in the stress and shock resistance mentioned above. Since the side longitudinal portions of the ribbon, when it is coiled, become tightly wound and can be contiguous, as seen in FIG. 3, the coil 40 can have a relatively small diameter, generally less than coils heretofore constructed with other cross-sectional configurations including those resembling the letter "V." FIG. 3 depicts enlarged, actual convolutions.

When the metal alloy of the coil contains aluminum in its make-up, such aluminum can form an insulating oxide at the surface of the ribbon after one or several heatings thereof, whereby the touching of the convolutions will not result in short-circuiting of the turns, this phenomenon being well known in the art. Because the contacting portions 52, 54 of the convolutions are mostly broad and have no sharp edges, there is little likelihood of the insulating oxide coating of the wire becoming penetrated and breaking down. Thus the present coil is resistant to failure from short circuits, more so than coils where sharp edges engage juxtaposed or contiguous flat surfaces.

The improved heating coil of this invention can be advantageously used in connection with igniter plugs other than those utilized in electric cigar lighters. In FIG. 4 there is shown a heating coil 40a which is disposed in a tubular metal shell 68 of an igniter plug of the type used in conjunction with jet engines or kindred devices. The outer convolution 62 of the coil 40a is bonded to the wall of the shell 68, and the inner convolution is bonded to the head of a central terminal stud 70, which is centrally mounted in the shell 68.

As is well understood, the shell 68 can be secured to a housing, or can form part of a threaded fitting by which it is adapted to operate in conjunction with related equipment.

Another embodiment of the invention is illustrated in FIGS. 5 and 6, wherein the heating element comprises a sprial wound coil which is of conical configuration, as distinguished from the flat pancake shape illustrated in FIGS. 1–3. The conical or dish-shape form of the coil is obtained as a result of one side flange of the ribbon being made thicker than the other side flange. This is clearly shown in FIG. 6, wherein consecutive convolutions 42b, 44b, 46b and 48b have opposite flange portions 52b, 54b with the latter showing a greater thickness, indicated by the arrows $T_1$, as compared with arrows $T_2$. The helical central longitudinal portion 50b is generally of substantially uniform thickness.

The ribbon of the coil 40b has beads 55 disposed on its convex side at the edges of the flanges 52b, 54b, as with the embodiment of FIGS. 1–3.

The coil is shown in FIG. 5 as assembled to a cup 34b of a cigar lighter. The cup 34b constitutes the "hot" terminal member for the coil, and the central rivet 37b constitutes the ground return terminal.

It will now be seen from the foregoing that we have provided a unique, improved spiral wound and tightly coiled igniting element which can be very easily formed in a spiral coil, does not have its cross-sectional configuration altered during such forming, and which can be fabricated from ribbon in a wide range of thicknesses. The coils can be of especially small size and have a high density of heater metal. The coiled element can have convolutions in a nesting arrangement whereby improved strength and ruggedness are had. Moreover, the ribbon stock can be readily formed by high production equipment, making for a low cost of fabrication of the coils.

Variations and modifications are possible without departing from the spirit of the invention.

We claim:

1. An electric heating element comprising, in combination:
   (a) a tight spiral coil of metal heater ribbon,
   (b) current-carrying members connected respectively to inner and outer portions of said spiral ribbon, to enable the latter to be electrically energized,
   (c) the convolutions of said ribbon having an insulating oxide coating to minimize electrical conduction between contiguous adjacent coil portions,
   (d) said ribbon having a cross-sectional shape which produces a bulbous surface on one side and which is characterized by a substantially flat central portion, opposite side flange portions each extending angularly on the same side of the flat central portion and each being of thinner section than said flat central portion, the free edges of said flange portions having longitudinal beads on those sides which are part of the bulbous surface of the ribbon.

2. A heating element as in claim 1, wherein:
   (a) the free edges of said side flange portions are thicker than the remainders of said flange portions.

3. A heating element as in claim 1, wherein:
   (a) the free edges of said side flange portions are devoid of projections on those sides which are opposite the bulbous surface of the ribbon.

4. A heating element as in claim 1, wherein:
   (a) one side flange portion is thicker than the other side flange portion whereby the coil is in the form of a cone.